United States Patent [19]

Botnick

[11] Patent Number: 4,739,798

[45] Date of Patent: Apr. 26, 1988

[54] MULTIPLE CONTROL VALVE FOR MIXING FLUIDS

[76] Inventor: Irlin H. Botnick, 3155 Kersdale, Pepper Pike, Ohio 44124

[21] Appl. No.: 928,799

[22] Filed: Nov. 10, 1986

[51] Int. Cl.$^4$ ............................................. F16K 11/18
[52] U.S. Cl. ................................. 137/630.2; 137/599; 137/607; 137/884; 251/257; 251/285
[58] Field of Search .................... 137/607, 630.2, 628, 137/625.12, 614.11, 614.12, 636.4, 599, 606, 884; 251/257, 900, 285

[56] References Cited

U.S. PATENT DOCUMENTS

| | | | |
|---|---|---|---|
| 908,759 | 1/1909 | Dolph | 137/614.12 X |
| 2,301,439 | 11/1942 | Moen | 137/607 X |
| 2,870,787 | 1/1959 | Rossi | 137/636.4 X |
| 3,074,434 | 1/1963 | Hughes et al. | 137/607 X |
| 3,192,952 | 7/1965 | Botnick . | |
| 3,370,609 | 2/1968 | Botnick . | |
| 3,437,112 | 4/1969 | Church | 137/636.3 X |
| 3,603,349 | 9/1971 | Botnick . | |
| 3,635,252 | 1/1972 | Botnick . | |
| 3,658,094 | 4/1972 | Botnick . | |
| 3,752,191 | 8/1973 | Botnick . | |
| 4,078,578 | 3/1978 | Buchholz | 137/614.11 X |
| 4,128,110 | 12/1978 | Haytayan | 251/900 X |
| 4,227,548 | 10/1980 | Botnick | 137/628 X |
| 4,610,272 | 9/1986 | Gottwald et al. | 251/285 X |

FOREIGN PATENT DOCUMENTS 639219  6/1928  France ................ 251/257

Primary Examiner—Martin P. Schwadron
Assistant Examiner—Stephen M. Hepperle
Attorney, Agent, or Firm—Wayne D. Porter, Jr.

[57] ABSTRACT

A mixing valve particularly suited for use as a water faucet includes separate levers for selectively delivering an unmixed flow of cold water, an unmixed flow of hot water, and one or more mixed flows of intermediate temperature water. An intermediate temperature flow is obtained by combining separate flow of cold and hot water in a mixing chamber. Temperature selection elements are provided to control the relative proportion of the flow of cold and hot water delivered to the mixing chamber so that any desired intermediate temperature can be selected for the mixed flow delivered from the mixing chamber. Constant temperature of a mixed flow is maintained throughout the available range of flow rates by coordinating the admittance of cold and hot flows to the mixing chamber with respect to the discharge of mixed fluid from the mixing chamber.

17 Claims, 7 Drawing Sheets

MULTIPLE CONTROL VALVE FOR MIXING FLUIDS

CROSS-REFERENCE TO RELATED PATENTS

SELECTABLE TEMPERATURE MIXING VALVE, U.S. Pat. No. 3,750,701, issued Aug. 7, 1973 to Irlin H. Botnick, here the "First Mixing Valve Patent," the disclosure of which is incorporated herein by reference.

MULTIPLE CONTROL VALVE FOR MIXING FLUIDS, U.S. Pat. No. 4,227,548, issued Oct. 14, 1980 to Irlin H. Botnick, here the "Second Mixing Valve Patent," the disclosure of which is incorporated herein by reference.

BACKGROUND OF THE INVENTION

1. Field of the Invention

The present invention relates to a variable flow mixing valve especially suited for use as a water faucet wherein either of two fluids may be delivered independently, or the two fluids may be mixed in preselected proportions for delivery.

2. Description of the Prior Art

Various forms of so-called mixing valves or faucets incorporating mixing valves have been developed for residential and other uses to deliver either of two fluids independently or to mix two fluids for delivery. Valves of this type are ordinarily used to deliver water at cold or hot supply temperatures, or at one or more intermediate temperatures, and at flow rates chosen by the user.

Early mixing valves consisted essentially of cold and hot water valve structures actuated by independent controls, but discharging jointly through a common spout. These dual control valves do not perform an internal mixing function but rather simply discharge regulated flows of cold and hot water through a common spout. A certain amount of skill is required by the user to independently adjust the dual flow controls to deliver water at a desired flow rate and at a desired temperature. If the controls are actuated to change the flow rate, the temperature of the mixed flow changes. Delivering water at a constant intermediate temperature throughout a range of available flow rates has been virtually impossible utilizing these early dual control valves.

More recently, mixing valves employing a single control have been developed. These single control valves typically provide a manually operable lever which is movable in one direction to deliver water at a selected temperature, and in another direction to provide a desired flow rate. Just as dual control valves require a certain amount of operator skill to effect delivery of water at a desired temperature and flow rate, single control valves likewise require a certain amount of operator skill to effect the desired operation. Trial and error positioning of the control is often required to obtain a mixed flow of desired temperature. To obtain a desired temperature at a desired flow rate is practically impossible and, if reached, is not repeatable.

The First Mixing Valve Patent presents a further advance in mixing valve art. Separate finger-operated controls are provided for supplying unmixed flows of cold and hot water. Additionally, one or more finger-operated controls are provided for supplying one or more mixed flows at a preselected intermediate temperature or temperatures. By this arrangement, each of the finger-operated controls regulates the delivery of water at a different delivery temperature. Delivery flow rate is established by positioning the proper control along its path of movement. Selection of the intermediate temperature or temperatures is effected by setting one or more flow restriction controls to properly proportion the relative rates of flow of cold and hot water which are supplied to each mixing chamber.

A primary valve element controls the admission of separate flows of cold and hot water to a mixing chamber. A secondary valve element regulates the flow of mixed fluid from the mixing chamber. The secondary valve element never closes completely and functions in concert with the primary valve element to assure the presence of a properly stabilized flow through the mixing chamber.

While the arrangement described in the First Mixing Valve Patent provides a rather easily serviceable unit which is producible as a durable structure at comparatively low cost, it does not provide a low cost operational "cartridge" which can be disposed of and readily replaced in the event the valve requires service. The First Mixing Valve Patent provided a very limited range of temperature adjustment and no control of maximum flow rate, and therefore was not acceptable. A problem not addressed by the First Mixing Valve Patent is the deterioration of the secondary elastomeric valve element due to repeated flexures and use of hot water, thereby losing complete control of temperature throughout the flow range. Moreover, some of the parts of the First Mixing Valve Patent require more complex fabrication techniques than are desirable, thereby adversely affecting the marketability of the device.

The Second Mixing Valve Patent discloses a multiple control mixing valve having a housing which is formed inexpensively as a stacked array of layer elements. The layer elements cooperate to define several overlying valve stages. A first stage is provided wherein (1) a flow of cold water is divided into at least two flow paths, (2) a flow of hot water is similarly divided into at least two flow paths, and (3) an adjustable restriction element is provided for controlling the flow rate along at least one of the cold and/or hot water flow paths.

Unrestricted flows of cold and hot water are delivered from the first stage to a second stage where separate lever-operated valve elements selectively control the admission of separate cold and hot flows directly to an outlet chamber located in a fourth stage. Proportioned flows of cold and hot water are delivered from the first stage to the second stage where one or more primary valve elements control the admission of these flows to one or more third stage mixing chambers. A separate secondary valve element controls discharge of mixed fluid from each of the third stage mixing chambers to the fourth stage outlet chamber.

A feature of the Second Mixing Valve Patent is a lost-motion or time delay mechanism operably interconnecting each set of primary and secondary valve elements to assure that a brief time interval lapses after the primary valve element opens before mixed fluid is permitted to discharge from the associated mixing chamber. Each of the lost-motion or time delay systems is designed such that some back pressure is maintained in its associated mixing chamber to attempt to maintain a constant temperature delivery throughout the available range of flow rates.

Although the Second Mixing Valve Patent has a variety of advantages as set forth in the patent, certain problems remain. The Second Mixing Valve Patent employs an elastomeric boot which overlies the outlet chamber and which is engaged by a plunger element to exert force through the boot to control the positioning of primary and secondary valve elements. It has been discovered that exposure to long term use and/or very hot fluids changes the characteristics of the seal such that the valve "chatters." The tendency of the valve to chatter generally renders it commercially unacceptable or, at least, suitable for use only in limited environments. Further, the deterioration of the secondary elastomeric valve element due to exposure to hot water and repeated flexures results in the inability of the valve to deliver water at constant temperature throughout the range of available flow rates. Compared to the First Mixing Valve Patent, the Second Mixing Valve Patent provides a somewhat increased temperature adjustment, but still has no control of maximum flow rate.

SUMMARY OF THE INVENTION

The present invention overcomes the foregoing and other drawbacks of the prior art by providing a new and improved multiple control mixing valve having a unique method of operation and valve elements which are particularly effective in delivering a mixed flow at a desired, constant temperature throughout the entire flow range of the valve. The valve according to the invention employs structure defining a mixing chamber, first and second inlets for admitting first and second fluid flows to the mixing chamber, and an outlet for delivering a mixed fluid flow from the mixing chamber. First and second inlet valve elements are provided for controlling the admission of fluid flow from the first and second inlets, respectively, to the mixing chamber, and an outlet valve element controls the delivery of mixed fluid through the outlet from the mixing chamber. A control means interconnects the inlet and outlet valve elements such that during a valve opening operation the inlet valve elements are fully opened before the outlet valve element starts to open. By controlling the operation of the valve elements in this manner, the pressures in the first and second inlets and the mixing chamber are balanced such that the temperature of the mixed fluid delivered through the outlet can be maintained constant throughout the full range of delivery rates.

In the preferred embodiment, the inlet valve elements are in the form of pistons movable toward and away from valve seats. The inlet pistons each carry a sealing member which is engageable with its associated valve seat. A particularly effective sealing member is an O-ring having a cross-section defining a sharp sealing edge, the O-ring being fitted into a conforming circumferential groove having a cross-section such that the O-ring is held in place within the groove. The control means in the preferred embodiment includes a control piston extending through the mixing chamber. The control piston includes a cam surface engageable with a portion of the first inlet piston, the cam surface configured such that downward movement of the control means causes the first inlet piston to move away from its corresponding valve seat, and upward movement of the control means permits the first inlet piston to move toward its valve seat under the influence of water pressure. The control means interacts with the second inlet piston in the same manner. The outlet valve element is included as part of the control piston. The outlet valve element establishes a sliding seal with respect to a valve seat.

The valve according to the invention also includes means for regulating the flow of fluid through the first and second inlets so that the temperature of the mixed fluid discharged through the valve outlet can be adjusted by the user. The valve rigidly maintains the ratio of hot to cold flows so that a desired, constant temperature is available throughout the entire flow range of the valve. The valve provides an adjustment of temperature from the temperature of the hot water to the temperature of the cold water of about 100°. It also provides complete control of flow rate from complete shut-off to full flow. The various components of the valve are housed in one or more cartridges which can be fabricated inexpensively and replaced in their entirety in the event of a malfunction. These and other features and advantages, and a fuller understanding of the invention, may be had by referring to the following description and claims, taken in conjunction with the accompanying drawings.

DESCRIPTION OF THE PREFERRED EMBODIMENT

Figure 1:
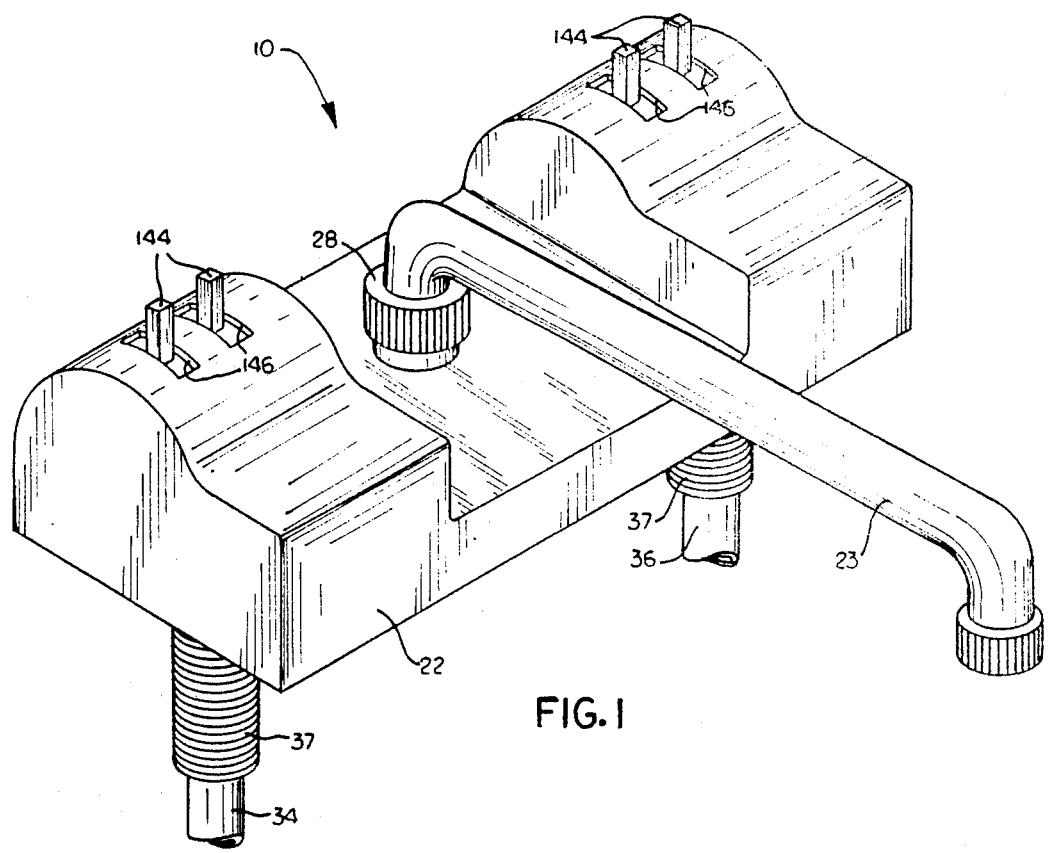
FIG. 1 is a perspective view of a faucet assembly including a mixing valve embodying the preferred practice of the present invention.
Figure 2:
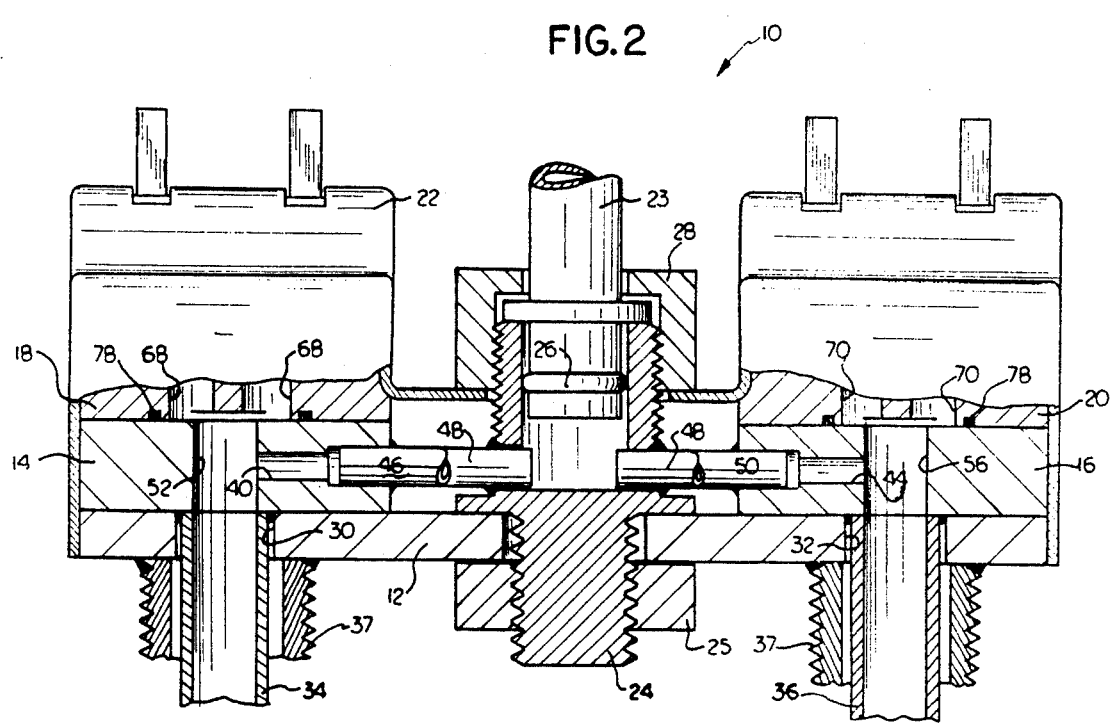
FIG. 2 is a front elevational view, partly in section, of the faucet assembly of FIG. 1 showing portions of a base plate, manifolds, cartridges, and connecting tubing.

Referring to FIGS. 1 and 2, a faucet assembly is indicated generally by the numeral 10. The faucet assembly 10 is of the type intended for use in residential or commercial applications to selectively supply an unmixed flow of cold water, an unmixed flow of hot water, or various mixed flows of cold and hot water.

The faucet assembly 10 includes a base plate 12 atop which manifolds 14, 16 are disposed. Mixing valve cartridges 18, 20 are disposed atop the manifolds 14, 16, respectively. A cover 22 overlies the foregoing components for decorative and protective purposes. The cover 22 includes a centrally disposed opening through which a spout-type water outlet 23 extends. The outlet 23 projects from a threaded fitting 24 which is connected to the base plate 12 by means of a nut 25. An O-ring 26 establishes a watertight seal between the outlet 23 and the inside of the fitting 24. A knurled nut 28 is disposed about the lower portion of the outlet 23 and helps to hold the cover 22 in place.

The base plate 12 includes spaced openings 30, 32 through which hot and cold inlets 34, 36 extend for connection to the manifolds 14, 16. The inlets 34, 36 are surrounded by short threaded pipe sections 37. The sections 37 are connected to the base plate 12 by brazing or other suitable means. The faucet assembly 10 can be secured to a countertop by fitting the pipe sections 37 with nuts (not shown). The faucet 10 also can be secured to a countertop by means of screws or bolts (not shown). Any conventional technique for supplying hot and cold water to the inlets 34, 36, and any conventional technique for securing the faucet assembly 10 to a countertop can be employed, and further discussion here concerning such details is not necessary.

Figure 13:
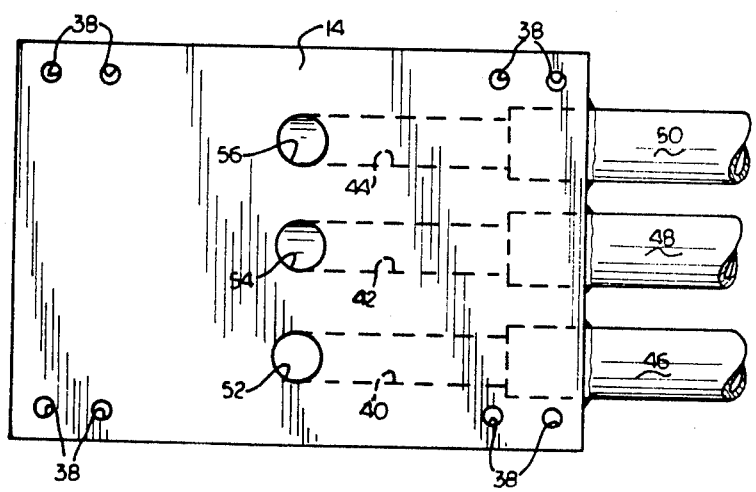
FIG. 13 is a top plan view of one of the manifolds shown in FIG. 2.

Referring also to FIG. 13, the manifold 14 is illustrated in more detail. The manifold 16 is identical to the manifold 14. For purposes of simplification, further discussion will be with respect to the manifold 14 only. The manifold 14 is a one-piece casting of brass or plastics material. The preferred material is brass to permit brazing of various inlet and outlet lines. The manifold 14 includes drilled and tapped through openings 38. The openings 38 can be used to secure the cartridge 18 to the upper surface of the manifold 14, and the openings 38 also can be used to secure the manifold to the base plate 12. The manifold 14 includes three parallel, laterally extending bores 40, 42, 44 to which conduits 46, 48, 50 are secured by brazing or other suitable means. The bores 40, 42, 44 terminate at approximately the center of the manifold 14. The bore 40 terminates in an opening 52 which extends completely through the manifold 14 (see FIG. 2). The bores 42, 44 terminate in openings 54, 56, respectively, which open only through the upper surface of the manifold 14. The conduits 46, 48, 50 are connected at their other ends to the manifold 16 in the same manner as they are connected to the manifold 14.

As will be apparent from an examination of FIGS. 2 and 13, hot water supplied through the inlet 34 will be directed upwardly through the opening 52 into the cartridge 18 and laterally through the bore 40 and the conduit 46 into the manifold 16. Similarly, cold water delivered through the inlet 36 will be directed upwardly into the manifold 16 where it will be directed upwardly into the cartridge 20 and laterally through the conduit 50 to the manifold 14. Water discharged from the cartridges 18, 20 will be directed downwardly through the opening 54 and laterally through the bore 42 and the conduit 48 to the fitting 24. As shown in FIG. 2, the conduit 48 extends through openings in the fitting 24 where a brazed connection is made.

Figure 3:
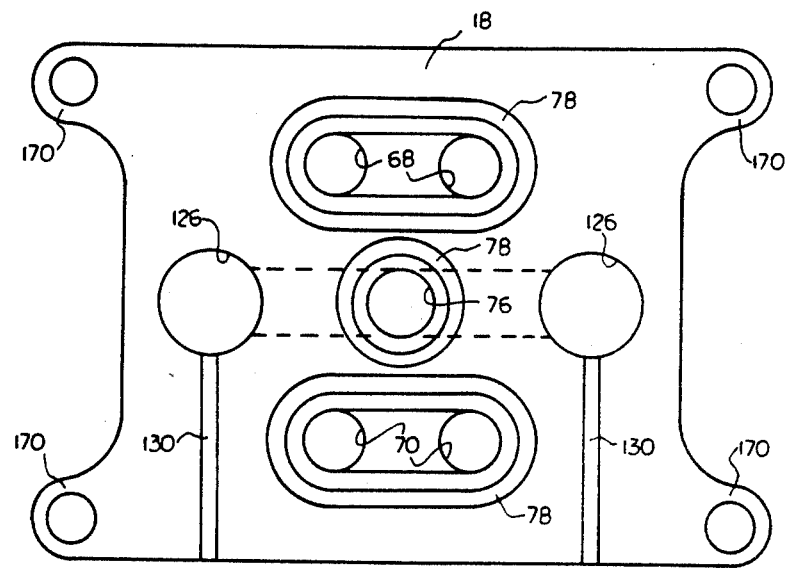
FIG. 3 is a bottom plan view of one of the cartridges partially shown in FIG. 2.
Figure 4:
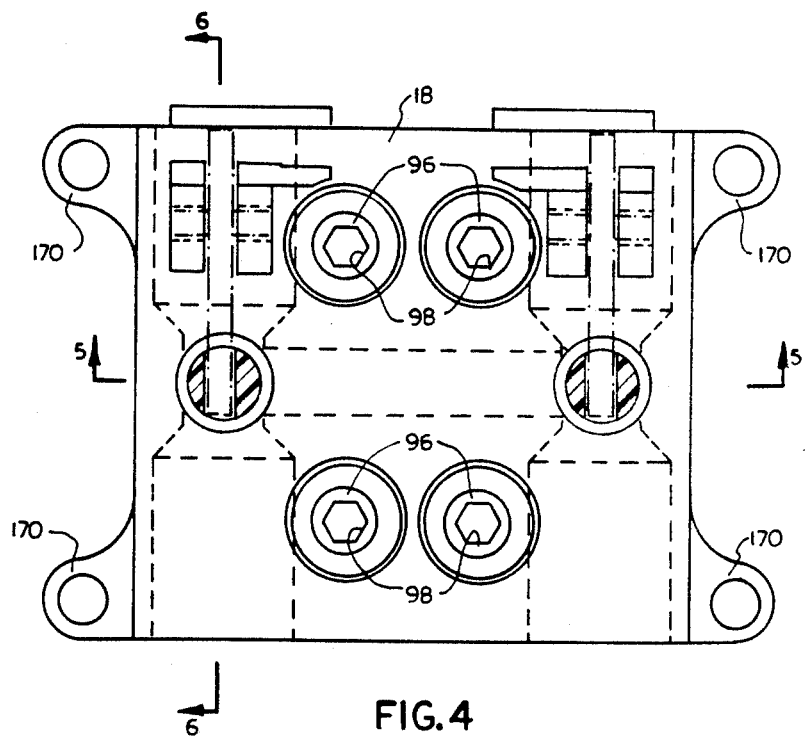
FIG. 4 is a top plan view, partly in section, of the cartridge of FIG. 3.
Figure 6:
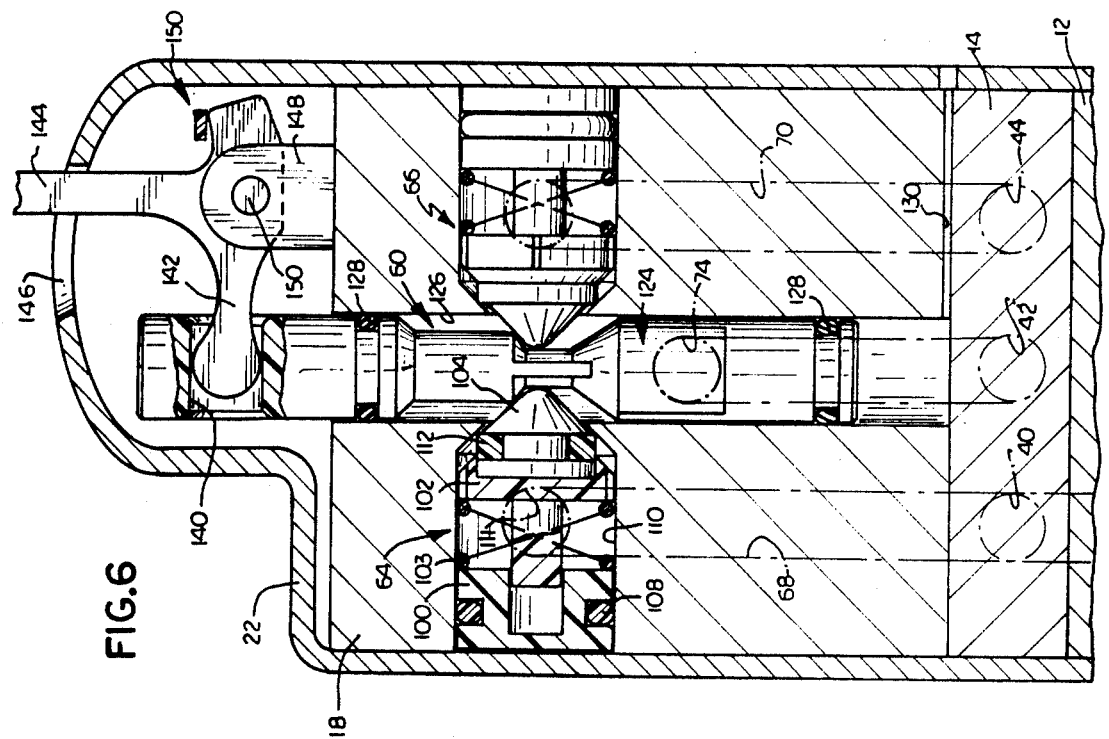
FIG. 6 is a cross-sectional view of the cartridge taken along line 6—6 in FIG. 4 showing inlet valve elements in a fully closed position.
Figure 5:
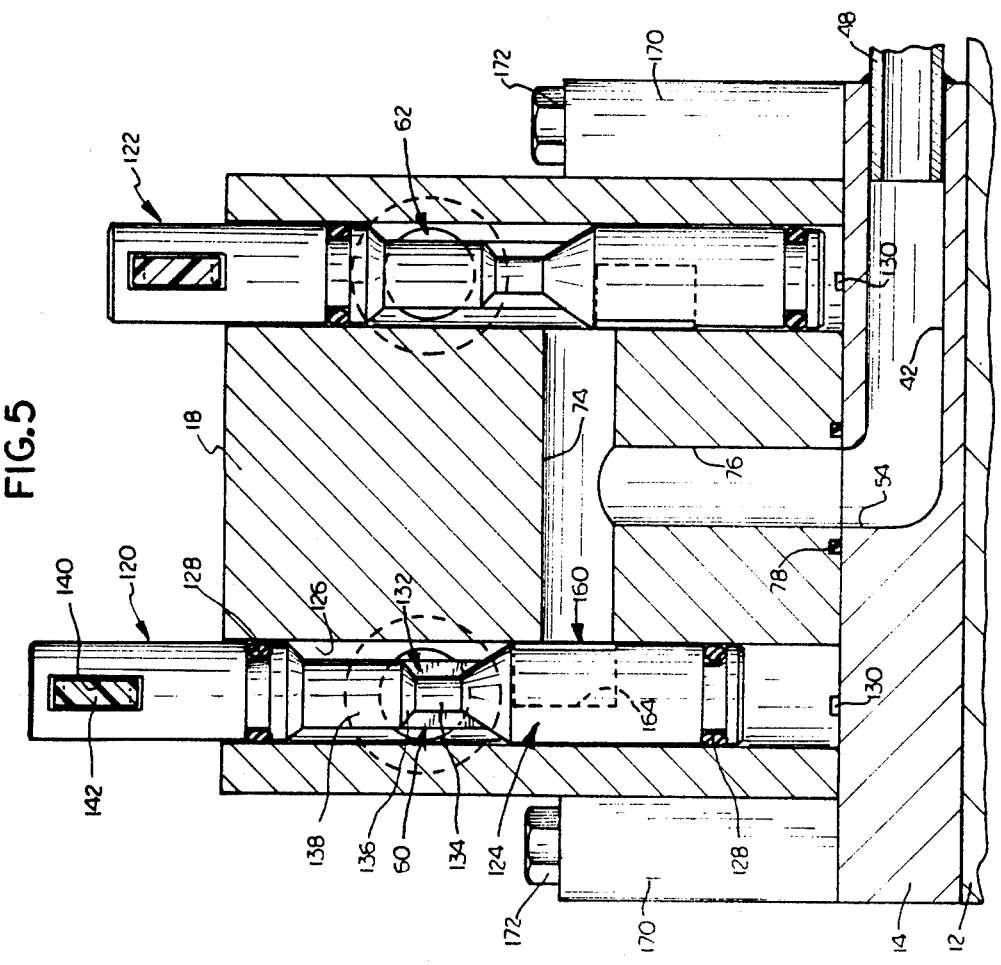
FIG. 5 is a cross-sectional view of the cartridge taken along line 5—5 in FIG. 4.

Referring now to FIGS. 3-6, the cartridge 18 is shown in more detail. As with the manifolds 14, 16, only the cartridge 18 will be described, it being understood that the cartridge 20 is substantially identical in construction and operation. The cartridge 18 is generally cubic in outer configuration and preferably is molded in an injection molding operation from a plastics material such as CELCON. The cartridge 18 is adapted to receive fluids from the inlets 34, 36 and to either deliver them to the outlet 23 unmixed, or to selectively mix them to provide a flow of fluid at a desired temperature. Referring particularly to FIGS. 5 and 6, the cartridge 18 includes a pair of mixing chambers 60, 62. Flows of hot and cold water are admitted into the mixing chambers 60, 62 in desired proportions by first and second valve elements 64, 66. The valve elements 64 control the admission of hot water into the mixing chambers 60, 62, while the valve elements 66 control the admission of cold water into the mixing chambers 60, 62.

Figure 11:
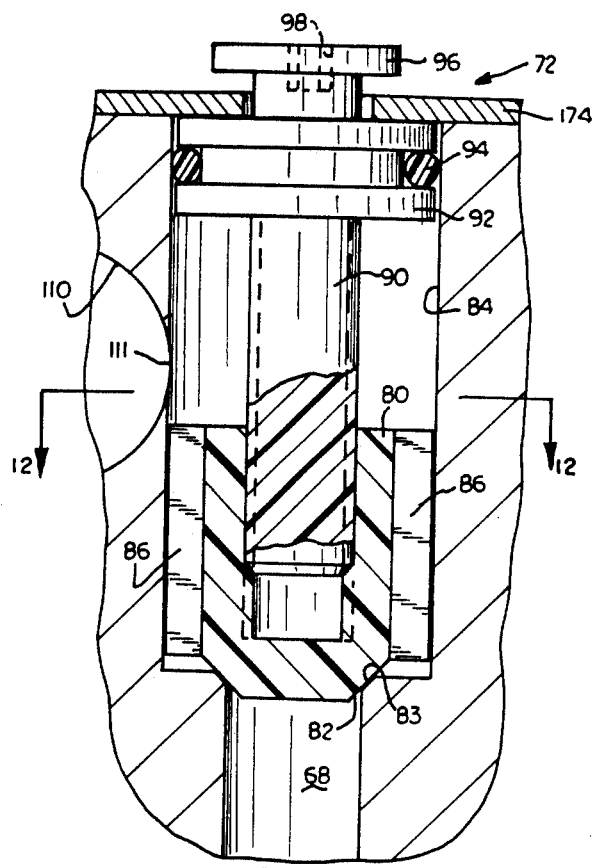
FIG. 11 is an enlarged cross-sectional view of one form of temperature adjusting valve which can be used as part of the invention.

Fluid is supplied to the first and second valve elements 64, 66 by vertically extending passageways 68, 70, respectively. Referring particularly to FIG. 11, the passageway 68 is illustrated along with a temperature adjusting valve 72. Similar valves 72 can be provided at the upper end of each of the passageways 68, 70. Referring also to FIGS. 3 and 4, two passageways 68 are provided to receive hot water supplied through the inlet 34 and two passageways 70 are provided to receive cold water supplied through the inlet 36. The passageways 68 are in fluid communication with each other at the bottom of the cartridge 18 and are arranged such that they overlie the opening 52 in the manifold 14. The passageways 70 are arranged similarly relative to the opening 56.

The mixing chambers 60, 62 discharge to a common horizontal outlet passageway 74 formed in the cartridge 18. A vertically extending passageway 76 opens into the passageway 74. The passageway 76 overlies the opening 54 so that fluid from the mixing chambers 60, 62 can flow into the manifold 14 for subsequent discharge through the conduit 48 and the outlet 23. In order to prevent fluid leakage at the interface between the cartridge 18 and the manifold 14, O-rings 78 are fitted into grooves surrounding the passageways 68, 70, 76.

Figure 12:
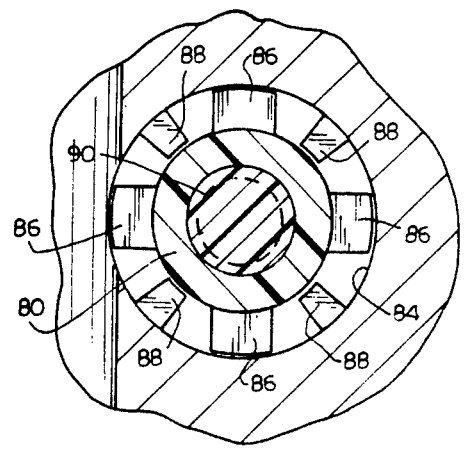
FIG. 12 is a cross-sectional view of the temperature adjusting valve of FIG. 11 taken along line 12—12 in FIG. 11.

Referring again to FIGS. 11 and 12, the temperature adjusting valve 72 is in the form of an internally threaded bobbin 80 having a chamfered end 82 engageable with a valve seat 83 formed at the upper end of the passageway 68 (or passageway 70, as the case may be). A counterbore 84 formed at the upper end of the passageway 68 receives the bobbin 80 for vertical, adjustable movement. In order to prevent the bobbin 80 from rotating, the bobbin is provided with laterally extending ribs 86 which engage vertically extending lugs 88 formed in the counterbore 84. A threaded fastener 90 is fitted into the backface of the bobbin 80. The fastener 90 includes an enlarged upper end 92 having a circumferential groove within which an O-ring 94 is fitted. A projection 96 extends upwardly from the exposed upper surface of the enlarged end 92. The projection 96 includes a hexagonal opening 98 (FIG. 4) into which an allen wrench or other suitable tool can be fitted. The projection 96 establishes a driving relationship with the fastener 90. As will be apparent from an examination of FIGS. 4, 11 and 12, upon rotation of the fastener 90, the chamfered end 82 will be moved toward or away from the valve seat 83. In turn, a controlled amount of fluid will be permitted to flow from the passageway 68 into the counterbore 84.

Figure 14:
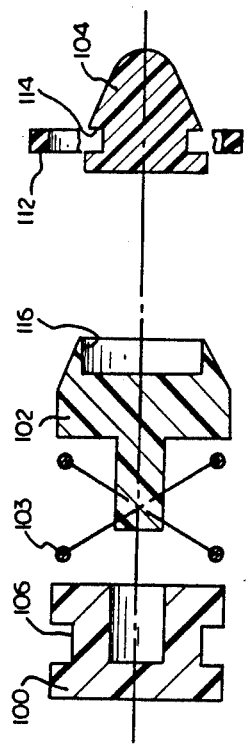
FIG. 14 is an exploded view of a portion of one of the inlet valve elements shown in FIG. 6.
Figure 15:
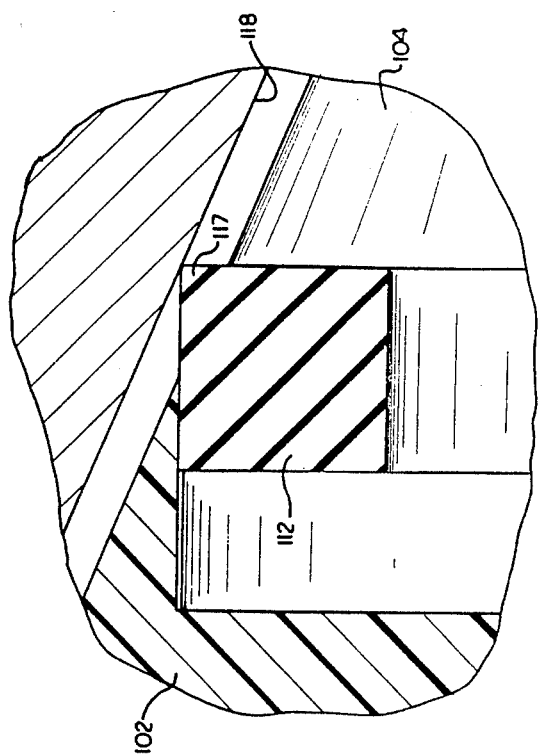
FIG. 15 is an enlarged view of one of the inlet valve elements shown in FIG. 6 illustrating in detail how a sealing action is effected.

Each of the valve elements 64, 66 are substantially identical and, for sake of convenience, only one of them will be described. Referring particularly to FIGS. 6 and 14, the valve element 64 includes a body portion 100, a piston 102 movable relative to the body portion 100, a spring 103 disposed intermediate the body portion 100 and the piston 102, and a rounded end 104 which is adapted to be secured to the piston 102. The body portion 100 includes a circumferential groove 106 within which an O-ring 108 is disposed. The O-ring 108 and the other components of the valve elements 64 fit within a bore 110 formed in the cartridge 18. An opening 111 is formed in the side of the bore 110 and provides fluid communication between the counterbore 84 and the bore 110. An O-ring 112, square in cross-section, is carried by a circumferential groove 114. The end 104 and the O-ring 112 together are fitted into a cavity 116 formed at the end of the piston 102. The end 104 is secured to the piston 102 securely as by ultrasonic welding or other conventional techniques. The resultant assembly shown in FIG. 15 presents a sharp edge 117 adapted to provide an exceedingly effective, fluidtight seal against a beveled end 118 formed at the end of the bore 110. The spring 103 assists the water pressure in biasing the valving elements 64, 66 toward the beveled end 118 when water pressure is too low. Because the O-ring 112 is almost completely encapsulated within the mated portions of the piston 102 and the end 104, it cannot be forced out of its protective encapsulating groove 114 when the O-ring leaves its sealing position as it could with a standard open O-ring groove. In turn, the valve element 64 will have a long and effective sealing action.

A control means 120, 122 is provided for the valve elements 64, 66 associated with each of the mixing chambers 60, 62. Each of the control means 120, 122 is substantially identical and only the control means 120 will be described.

The control means 120 is in the form of a piston 124. The piston 124 is reciprocal in a vertically extending passageway 126 which is in fluid communication with the bore 110. The piston 124 includes upper and lower circumferential grooves carrying O-rings 128 so as to provide fluidtight seals within the passageway 126. Laterally extending channels 130 are formed on the bottom surface of the cartridge 18 to relieve air pressure within the bottom of the passageway 126 and thereby permit the piston 124 to move up and down and remain stationary in any position. The piston 124 includes a center, camming surface 132 defined by a center section 134 of reduced thickness, an outwardly flared shoulder portion 136, and a cylindrical upper section 138 of enlarged diameter. The camming surface 132 engages the rounded end 104 of the piston 102 and, upon downward movement of the piston 124, causes the valve elements 64, 66 to open. Upon upward movement to the piston 124, the water pressure closes the valve elements 64, 66.

Figure 19:
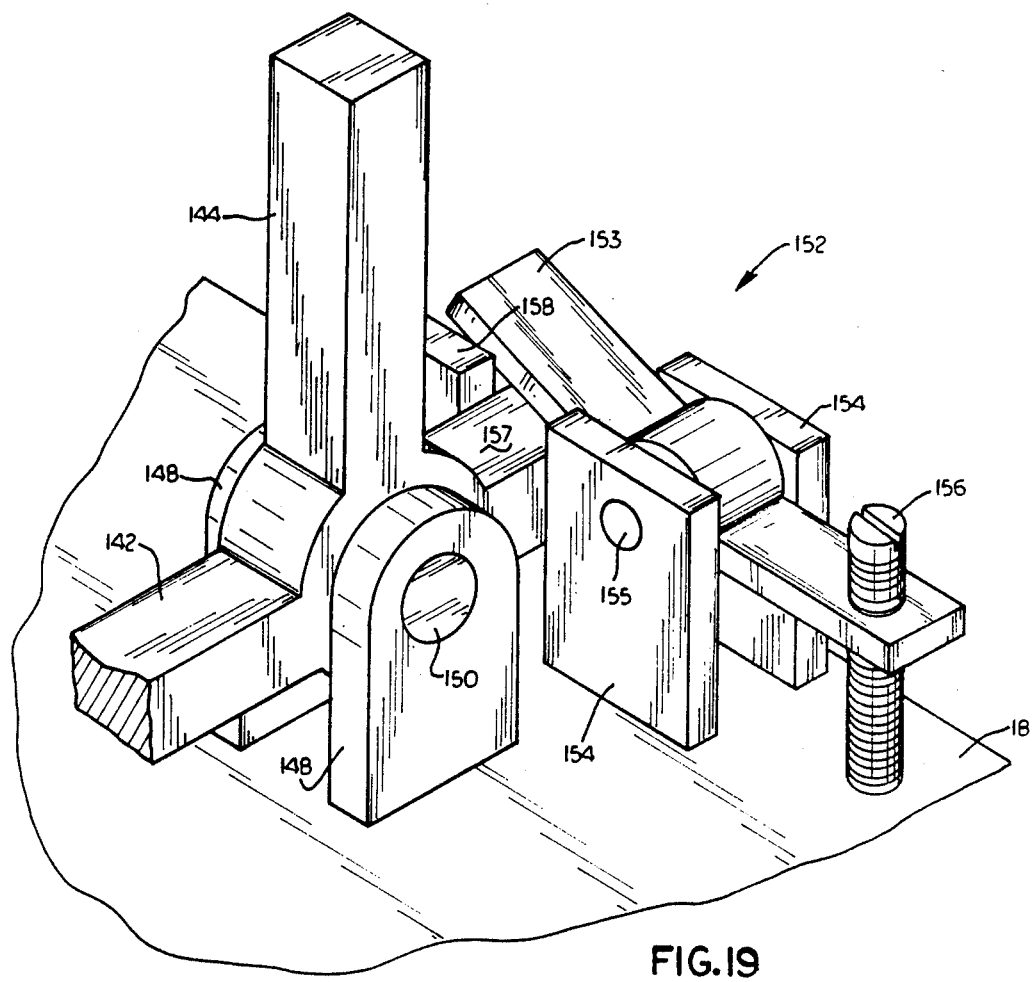
FIG. 19 is a perspective view of a control mechanism used to actuate the inlet and outlet valve elements.

The upper end of the piston 124 includes a cut-out section 140 through which the end 142 of a lever 144 extends. The lever 144 extends upwardly through an opening 146 formed in the cover 22. Referring to FIG. 19, the lever 144 is pivotally mounted to the cartridge 18 by a pair of upstanding supports 148 through which a pin 150 is fitted. The lever 144 also includes an adjustment mechanism 152 for limiting the extent to which the lever 144 can be moved. The adjustment mechanism 152 employs a lever 153 pivotally mounted to the cartridge 18 by a pair of upstanding supports 154 tbrough which a pin 155 is fitted. A vertically oriented screw 156 is threaded through one end of the lever 153 into engagement with the upper surface of the cartridge 18. The other end of the lever 153 overlies an extension 157 of the lever 144 projecting from that portion of the lever 144 opposite the end 142. Spaced upstanding guide members 158 receive the end of the lever 153 for up and down movement. The supports 154, 158 are spaced from each other a distance sufficient to accommodate, and guide, the up, down and sideways movement of the extensions 153, 157.

It is expected that other arrangements could be made to control movement of the piston 124. An especially simple and effective technique which could be used in lieu of the adjustment mechanism 152 heretofore described would be to extend a tab laterally from the side of the piston 124 above the upper surface of the cartridge 18. By providing a threaded opening in the tab, and by threading a flat-bottomed screw through the opening, the maximum desired downward movement of the piston 124 could be controlled easily. It presently is expected that this alternate adjustment technique will constitute the best mode of an adjustment mechanism according to the invention.

Figure 10:
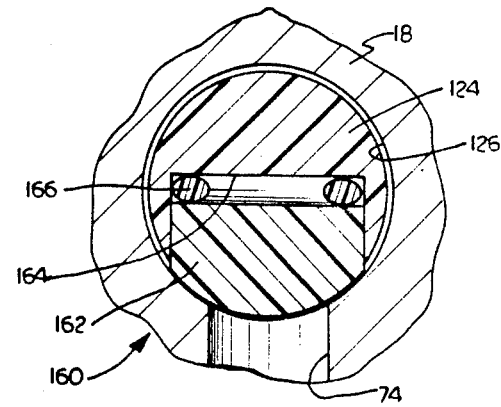
FIG. 10 is an enlarged cross-sectional view of the outlet valve element taken along line 10—10 in FIG. 7.

The piston 124 also includes an outlet valve element 160. Referring particularly to FIG. 10, tbe valve element 160 is in the form of a slide block 162 adapted to smoothly engage the face of the passageway 126 where it opens into the passageway 74. The slide block 162 is fitted into a cavity 164 formed in the piston 124 and is urged outwardly into engagement with the sides of the passageway 126 by an O-ring 166 disposed intermediate the backface of the slide block 162 and the cavity 164.

Referring to FIGS. 3-5, the cartridge 18 also includes a plurality of bosses 170 through which bolts 172 extend. The bolts 172 engage certain of the threaded openings 38 in the manifold 14 and tightly connect the cartridge 18 to the manifold 14. In order to contain the threaded fasteners 90 and the piston 102 within the counterbores 84 and the bores 110, respectively, a separate cover plate 174 is fitted over the cartridge 18. The cover 22 is fitted over the cover plate 174 for aesthetic purposes.

Figure 16:
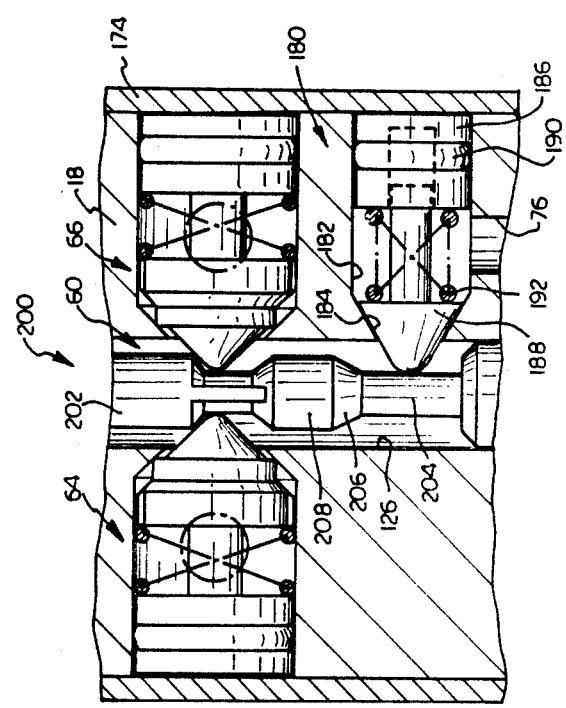
FIG. 16 is a view similar to FIG. 6 showing an alternative embodiment of the outlet valve element.

Referring to FIG. 16, an alternative embodiment of an outlet valve element is shown. The valve element illustrated in FIG. 16, identified by the reference numeral 180, is substantially similar to the first and second valve elements 64, 66 described previously. The valve element 180 is disposed within a bore 182 having a beveled end 184 opening into the passageway 126. The passageway 76, or its equivalent, opens into the bore 182. The valve element 180 includes a body portion 186, and a piston 188 movable relative to the body portion 186. Unlike the piston 102, the piston 188 is of one-piece construction. The body portion 186 includes a circumferential groove within which an O-ring 190 is disposed. A spring 192 is fitted between the body portion 186 and the back face of the piston 188 in order to urge the piston 188 toward engagement with the beveled end 184.

The valve element 182 is actuated by a control means 200. The control means 200 is in the form of a piston 202 substantially similar to the piston 124 described previously. The most important difference is that the outlet valve element 160 has been eliminated and replaced by a section 204 of reduced thickness. The section 204 includes a camming surface 206 which terminates at its upper end at a cylindrical section 208 of enlarged diameter. As will be apparent from an examination of FIG. 16, downward movement of the piston 202 will cause the valve elements 64, 66 to open relatively quickly while the outlet valve element 180 remains closed. Eventually, the camming surface 206 will cause the piston 188 to be displaced to the right in FIG. 16 such that fluid will be permitted to flow from the mixing chamber 60 into the passageway 76. Due to the gradual taper of the camming surface 206, the rate of flow can be modulated easily. Because the valve element 180 performs a sealing function only during the initial stages of valve operation, a superior sealing action is not required, and thus the particular construction of the valve elements 64, 66, especially the use of the O-ring 112, is not necessary.

Figures 17, 18:
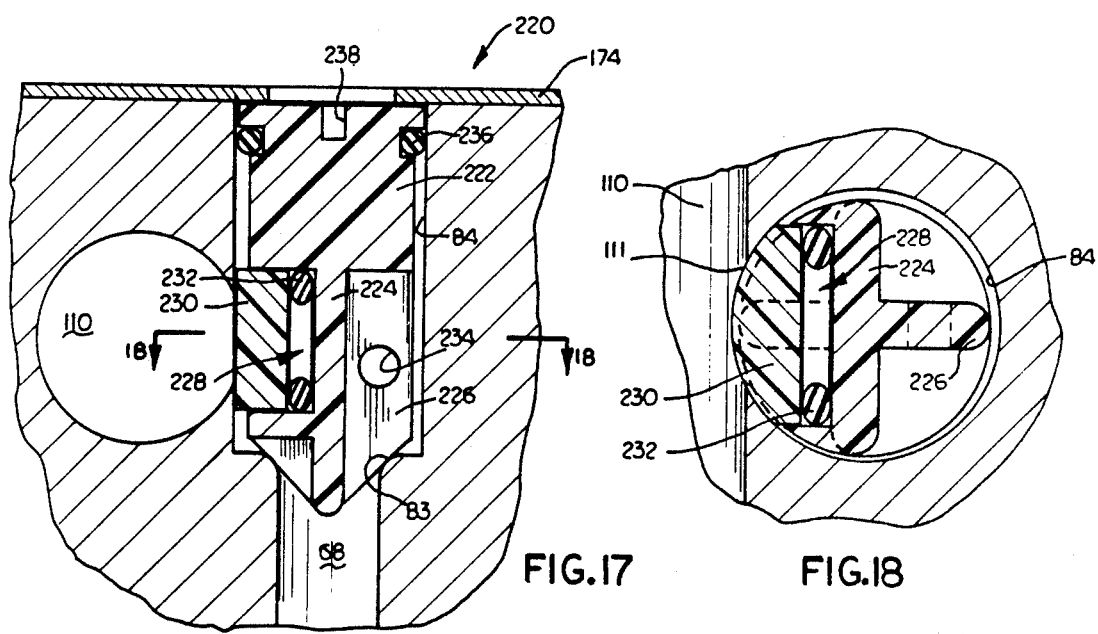
FIG. 17 is a view similar to FIG. 11 showing an especially preferred embodiment of the temperature adjusting valve.
FIG. 18 is a cross-sectional view of the temperature adjusting valve of FIG. 17 taken along line 18—18 in FIG. 17.

Referring to FIGS. 17 and 18, an alternate, and preferred, embodiment of a temperature adjusting valve is shown. The temperature adjusting valve shown in FIGS. 17 and 18, identified by the reference numeral 220, constitutes the best mode of the temperature adjusting valve according to the invention. The temperature adjusting valve 220 is intended as a direct replacement for the temperature adjusting valve 72 and cooperates with the counterbore 84 and the bore 110 to provide an effective valving action. The temperature adjusting valve 220 includes a body portion 222, cylindrical at its upper end and having a wall 224 and a web 226 at its lower end. A cavity 228 is formed in the wall 224. A slide block 230 is fitted into the cavity 228 and is urged outwardly into engagement with the sides of the counterbore 84 by an O-ring 232 disposed intermediate the back face of the slide block 230 and the cavity 228. The web 226 includes a through opening 234. The upper end of the body portion 222 includes a circumferential groove within which an O-ring 236 is fitted. The upper surface of the body portion 222 includes a slot 238 adapted to receive the end of a screwdriver or other means of rotation.

Unlike the temperature adjusting valve 72, the valve 220 does not move up and down within the counterbore 84. Rather, the valve 220 establishes a seal by rotating about its longitudinal axis, thereby opening or closing the opening 111 from the counterbore 84 into the bore 110 as much or as little as may be desired. The spaces between the wall 224 and the web 226, as well as the opening 234, permit fluid to flow readily from the passageway 68 into the counterbore 84. The sliding seal established by the slide block 230 is especially effective in accurately controlling the amount of fluid that is permitted to flow into the bore 110. The configuration of the valve 220 is such that it can be manufactured less expensively than the valve 72, and it should be more effective and reliable in operation.

Operation

The faucet assembly 10 is operated as follows:

1. The temperature adjusting valves 90 or 220, as the case may be, are adjusted through access openings (not shown) in the cover 22 to establish a desired ratio of hot to cold water entering the mixing chambers 60, 62.

2. The screws 156 are adjusted to control the displacement of the levers 144 such that a desired maximum flow rate is established.

Figure 7:
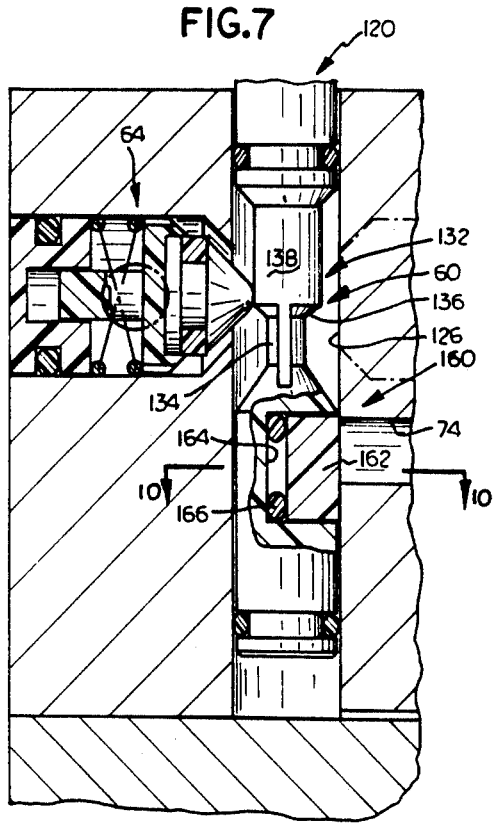
FIG. 7 is a cross-sectional view of a portion of the cartridge showing an inlet valve element in its fully opened position while an outlet valve element is in a closed position, the outlet being shown 90° out of position for purposes of clarity of illustration.

3. As a given lever 144 is pulled forward, the piston 124 (or 202) moves down. The cam surface 136 engages the rounded ends 104 of the pistons 102 causing the O-rings 112 to unseat to full open. Water quickly enters the mixing chamber 60 or 62 where it is mixed thoroughly. See FIG. 7.

4. As the piston 124 (or 202) is moved further down, the outlet valve element 160 (or 180) continues to block off the flow of fluid from the mixing chambers 60 or 62.

5. The shortness of the cam surfaces 136 and the length of the sections 134 and 138 are such that the valve elements 64, 66 are fully open before any fluid begins to be discharged from the mixing chambers 60, 62.

Figure 8:
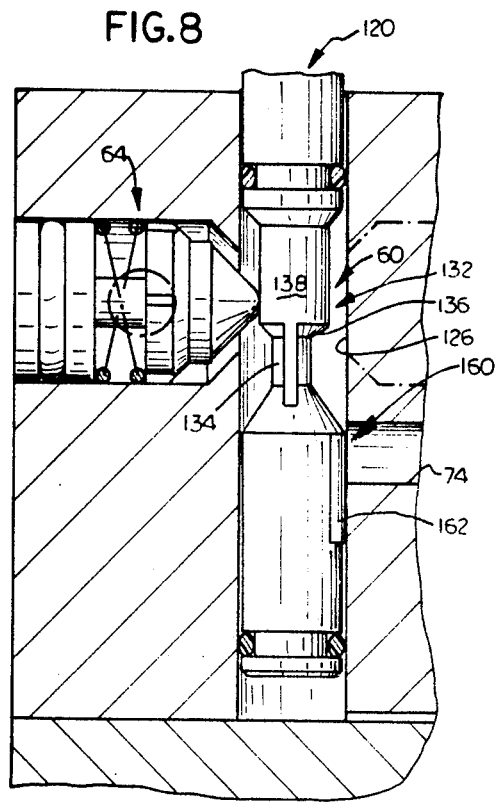
FIG. 8 is a view similar to FIG. 7 showing the outlet valve element just starting to open.

6. As the piston 124 (or 202) is moved further down, the valve element 160 (or 180) starts to open, permitting thoroughly mixed fluid to be discharged through the passageway 74 (or 76). See FIG. 8.

Figure 9:
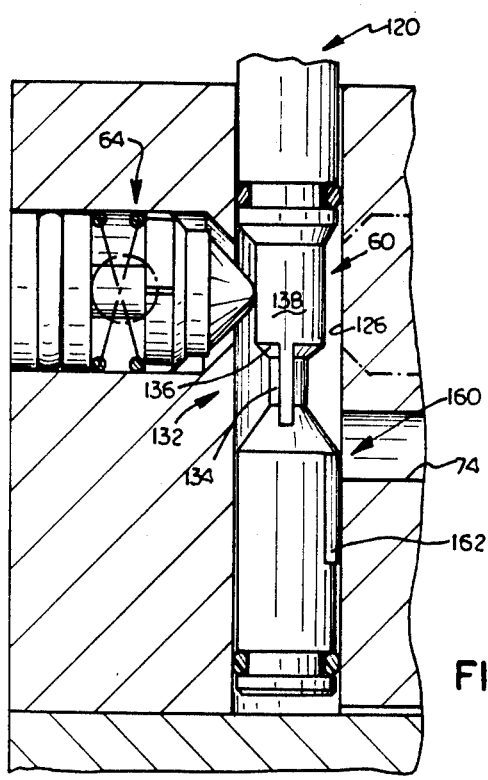
FIG. 9 is a view similar to FIG. 8 showing the outlet valve element in a further opened position.

7. Further downward movement of the piston 124 (or 202) increases the outlet opening 74, thereby further increasing the outlet flow rate. See FIG. 9. The inlet flow ratio remains constant thereby controlling temperature.

8. Appropriate adjustments to the temperature adjusting valves 72 (or 220) and to the screws 156 can be made until desired temperatures and flow rates are established upon actuation of each of the levers 144.

It is expected that the temperature adjusting valves 72 (or 220) will be adjusted such that the lever 144 on the left as shown in FIG. 2 can be full hot or any mixed temperature, the lever 144 on the right can only be full cold, and the center levers 144 will deliver mixed flows of fluid at any intermediate temperatures. It is apparent that the user can adjust the faucet assembly 10 to provide any desired, absolutely repeatable combination of flow temperatures and flow rates.

It also is possible that other cartridges 18 can be added, or that the faucet assembly 10 can be provided with only a single cartridge 18. Accordingly, although the invention has been described in its preferred form with a certain degree of particularity, it will be understood that the present disclosure has been made only be way of example and that various changes may be resorted to without departing from the true spirit and scope of the invention as hereinafter claimed. Further, the use herein of such terms as "vertically," "up," "down," and other, similar terms describing the spatial relationship of various components to each other is intended for convenience only and no particular orientation of the invention or its components is to be implied from the use of such terms. It is intended that the patent shall cover, by suitable expression in the appended claims, whatever features of patentable novelty exist in the invention disclosed.

What is claimed is:

1. A valve for mixing first and second fluids to produce a mixed flow at a constant temperature at all flow rates, comprising:
   structure defining a mixing chamber;
   first and second inlets for admitting first and second fluids to the mixing chamber;
   an outlet for delivering a mixed fluid flow from the mixing chamber;
   first valve element means in the form of a first piston movable toward and away from a valve seat for controlling the admission of the first fluid through the first inlet into the mixing chamber, the first piston having a portion extending into the mixing chamber;

second valve element means in the form of a second piston movable toward and away from a valve seat for controlling the admission of the second fluid through the second inlet into the mixing chamber, the second piston having a portion extending into the mixing chamber;

outlet valve element means for controlling the delivery of mixed fluid through the outlet from the mixing chamber; and control means for the first, second and outlet valve element means, the control means extending at least partially into the mixing chamber and including cam surfaces engageable with the portions of the first and second pistons extending into the mixing chamber, the control means operating such that during a valve opening opertion the first and second valve element means are fully opened before the outlet valve element means begins to open.

2. The valve of claim 1, wherein each piston includes a sealing member engageable with the valve seat, the sealing member being in the form of an O-ring defining a sharp sealing edge.

3. The valve of claim 2, wherein each piston is of two-piece construction, tbe separate pieces when fitted together defining a circumferential groove within which the O-ring is disposed, the groove encapsulating at least a portion of the O-ring.

4. The valve of claim 1, wherein the control means includes a portion defining the outlet valve elements means.

5. The valve of claim 4, wherein the outlet valve element means engages a valve seat included as part of the mixing chamber, the valve seat being arranged relative to the piston such that a sliding seal is established.

6. The valve of claim 1, wherein the cam surfaces include a straight portion where no piston movement occurs, a beveled portion in which piston movement occurs, and a second straight portion spaced from the first straight portion wherein no piston movement occurs.

7. The valve of claim 1, further comprising first and second temperature adjusting means for the first and second inlets, respectively, for controlling the amount of fluid which can flow from the first and second inlets into the mixing chamber.

8. The valve of claim 7, wherein each of the first and second temperature adjusting means is in the form of a piston movable toward and away from a valve seat.

9. The valve of claim 8, wherein the piston is disposed in a bore, the backface of the piston includes a threaded opening, and a threaded member extends into the opening such that, upon rotation of the threaded member, the piston is moved toward and away from its valve seat.

10. The valve of claim 7, wherein each of the first and second temperature adjusting means is in the form of a body portion movable relative toward and away from a valve seat.

11. The valve of claim 10, wherein the body portion is disposed in a bore, the body portion includes a cavity within which a sealing member is disposed, and the sealing member is positioned relative to the valve set such that, upon rotation of the body portion, the sealing member slides relative to the valve seat.

12. Tbe valve of claim 1, further comprising a manifold to which the structure defining the mixing chamber is secured 13. The valve of claim 12, wherein the manifold is in the form of a block having openings formed therein for the passage of the first and second fluid flows and an outlet flow, the first and second openings and the outlet opening being in fluid communication with the first and second inlets and the outlet of the structure that define the mixing chamber.

14. The valve of claim 13, wherein a fluid-tight condition is established between the structure and the manifold by O-rings disposed about the first and second openings and the outlet openings, the O-rings being compressed in use between the structure and the manifold.

15. The valve of claim 1, wherein the outlet valve element means is in the form of a piston movable toward and away from a valve seat.

16. The valve of claim 15, wherein the control means is in the form of a piston disposed at least partially in the mixing chamber; and the outlet valve element piston includes a rounded end in engagement with the control means piston.

17. The valve of claim 1, wherein the control means includes a manually displaceable lever, the control means further including an adjustment mechanism for controlling the extent to which the lever can be displaced.

* * * * *

UNITED STATES PATENT AND TRADEMARK OFFICE
CERTIFICATE OF CORRECTION

PATENT NO. : 4,739,798
DATED : April 26, 1988
INVENTOR(S) : Irlin H. Botnick

It is certified that error appears in the above-identified patent and that said Letters Patent are hereby corrected as shown below: Title page:

Abstract, line 6 -- "flow" should be "flows".
Column 5, line 66 -- "tbrough" should be "through".
Column 5, line 68 -- "tbe" should be "the".
Column 6, line 4 -- "tbe" should be "the".
Column 10, line 20 -- "tbe" should be "the".
Column 10, line 41 -- "tbe" should be "the".

Column 11, line 20 -- "opertion" should be "operation".
Column 11, line 28 -- "tbe" should be "the".
Column 12, line 17 -- "set" should be "seat".

Signed and Sealed this

Sixth Day of September, 1988

Attest:

DONALD J. QUIGG

Attesting Officer

Commissioner of Patents and Trademarks